(12) United States Patent
Lee et al.

(10) Patent No.: US 10,800,132 B2
(45) Date of Patent: Oct. 13, 2020

(54) CLOTH HAVING GAS SHEET

(71) Applicants: Sang Geun Lee, Gwangju-si (KR); Chae Eun Lee, Gwangju-si (KR); Ji Ah Lee, Gwangju-si (KR)

(72) Inventors: Sang Geun Lee, Gwangju-si (KR); Chae Eun Lee, Gwangju-si (KR); Ji Ah Lee, Gwangju-si (KR)

(*) Notice: Subject to any disclaimer, the term of this patent is extended or adjusted under 35 U.S.C. 154(b) by 0 days.

(21) Appl. No.: 16/439,903

(22) Filed: Jun. 13, 2019

(65) Prior Publication Data

US 2019/0308386 A1 Oct. 10, 2019

Related U.S. Application Data

(62) Division of application No. 15/413,702, filed on Jan. 24, 2017, now Pat. No. 10,357,935.

(30) Foreign Application Priority Data

Feb. 2, 2016 (KR) .......................... 10-2016-0012647
Apr. 21, 2016 (KR) .......................... 10-2016-0048655

(51) Int. Cl.
*B32B 3/26* (2006.01)
*B32B 5/02* (2006.01)
(Continued)

(52) U.S. Cl.
CPC ............ *B32B 3/26* (2013.01); *A41D 13/0125* (2013.01); *A41D 13/0155* (2013.01); *A41D 31/065* (2019.02); *A41D 31/085* (2019.02); *A41D 31/285* (2019.02); *B32B 3/12* (2013.01); *B32B 3/30* (2013.01); *B32B 5/024* (2013.01); *B32B 5/26* (2013.01); *B32B 25/042* (2013.01); *B32B 25/08* (2013.01); *B32B 25/10* (2013.01); *B32B 25/14* (2013.01); *B32B 25/16* (2013.01); *B32B 25/18* (2013.01); *B32B 25/20* (2013.01); *B32B 27/08* (2013.01); *B32B 27/12* (2013.01); *B32B 27/283* (2013.01); *B32B 27/302* (2013.01); *B32B 27/304* (2013.01);
(Continued)

(58) Field of Classification Search
CPC ......... B32B 3/26; B32B 3/30; A41D 13/0155; D03D 15/00; D03D 1/02
See application file for complete search history.

(56) References Cited

U.S. PATENT DOCUMENTS 1,999,067 A * 4/1935 Stevenson ............... D03D 39/00
139/402
3,008,214 A * 11/1961 Foster ....................... D03D 1/02
428/12
(Continued)

FOREIGN PATENT DOCUMENTS

| GB | 550668 A | * | 1/1943 | ............ D03D 11/00 |
| WO | WO-2010114298 A2 | * | 10/2010 | ............ D06B 3/045 |
| WO | WO-2015190920 A1 | * | 12/2015 | ........... D03D 1/0035 |

*Primary Examiner* — Hai Vo
(74) *Attorney, Agent, or Firm* — Korus Patent, LLC; Seong Il Jeong

(57) ABSTRACT

In one aspect, there is provided a fabric containing gas therein, the fabric comprising a weave between warps and wefts, wherein each warp includes an elongate array of a plurality of individual gas cells, wherein neighboring gas cells are physically coupled to each other via a connection, wherein the connection is monolithic with the gas cells, and each cell contains the gas therein.

4 Claims, 10 Drawing Sheets

(51) Int. Cl.
    *B32B 3/12*     (2006.01)
    *D03D 1/00*     (2006.01)
    *D03D 1/02*     (2006.01)
    *D03D 15/00*    (2006.01)
    *A41D 13/012*   (2006.01)
    *A41D 13/015*   (2006.01)
    *A41D 31/06*    (2019.01)
    *A41D 31/08*    (2019.01)
    *A41D 31/28*    (2019.01)
    *B32B 3/30*     (2006.01)
    *B32B 5/26*     (2006.01)
    *B32B 25/04*    (2006.01)
    *B32B 25/08*    (2006.01)
    *B32B 25/10*    (2006.01)
    *B32B 25/14*    (2006.01)
    *B32B 25/16*    (2006.01)
    *B32B 25/18*    (2006.01)
    *B32B 25/20*    (2006.01)
    *B32B 27/08*    (2006.01)
    *B32B 27/12*    (2006.01)
    *B32B 27/28*    (2006.01)
    *B32B 27/30*    (2006.01)
    *B32B 27/32*    (2006.01)
    *B32B 27/40*    (2006.01)

(52) U.S. Cl.
    CPC ............ *B32B 27/308* (2013.01); *B32B 27/32* (2013.01); *B32B 27/40* (2013.01); *D03D 1/0035* (2013.01); *D03D 1/02* (2013.01); *D03D 15/00* (2013.01); *A41D 2400/14* (2013.01); *B32B 2250/03* (2013.01); *B32B 2250/04* (2013.01); *B32B 2250/20* (2013.01); *B32B 2262/02* (2013.01); *B32B 2262/023* (2013.01); *B32B 2262/0207* (2013.01); *B32B 2262/0238* (2013.01); *B32B 2262/0246* (2013.01); *B32B 2262/0253* (2013.01); *B32B 2262/0269* (2013.01); *B32B 2262/0292* (2013.01); *B32B 2305/02* (2013.01); *B32B 2307/304* (2013.01); *B32B 2307/306* (2013.01); *B32B 2307/56* (2013.01); *B32B 2307/73* (2013.01); *B32B 2571/00* (2013.01); *D10B 2501/04* (2013.01)

(56)  References Cited

U.S. PATENT DOCUMENTS 5,235,715 A  *  8/1993  Donzis .................... B32B 3/26
                                                     12/142 R
10,138,575 B2 * 11/2018  van der Gaag ...... D03D 1/0035

* cited by examiner

CLOTH HAVING GAS SHEET

CROSS-REFERENCE TO RELATED APPLICATION

This application claims the benefit of Korean Patent Application No. 10-2016-0012647 filed on Feb. 2, 2016, and Korean Patent Application No. 10-2016-0048655 filed on Apr. 21, 2016, the entire contents of which are incorporated herein by reference for all purposes as if fully set forth herein.

BACKGROUND

Field of the Present Disclosure

The present disclosure relates to a cloth with independent gas cells and methods of fabricating the cloth. More particularly, the present disclosure relates to a cloth with independent gas cells and methods of fabricating the cloth wherein the cloth with independent gas cells may be formed by weaving a gas cell warp and a general fabric weft with each other such that the area of the cloth can be increased as desired, and gaps may be defined in the woven fabric to enable air permeability, and the manufacturing cost of the gas cell fabric may be reduced because there is no need to enlarge a roller or a press to make the gas cell warp.

The present disclosure relates to a cloth including a gas sheet having multiple individual gas cells formed therein. More particularly, the present disclosure relates to a cloth including a gas sheet having multiple individual gas cells formed therein, each cell having substantially a sphere shape, each cell having a carbonic acid gas or helium gas filled therein, wherein each cell may be ruptured or maintained, if desired, in use, wherein the present cloth may be employed for firefighter clothes or lifesaving clothes.

Discussion of the Related Art

The textile industry, which had been treated as a fading industry in the past, has recently emerged as a new high-value-added industry with the development of various functional fabrics using state-of-the-art technology.

Functional fabrics may be produced by weaving new functional yarns, by coating new functional materials on the surface of conventional fabrics, or by combining various yarns to make new structure fabrics. For example, the functional fabrics may have improvement in breathable, sweat-releasing, heat-insulating, hygroscopic, antimicrobial, heat-insulating, abrasion-resistant, and soft-touch properties. Further, the functional fabrics may shield electromagnetic waves and static electricity or may harvest energy during action.

As one of such functional fabrics, the present applicant has developed a cloth having a gas cell filled with a gas such as carbon dioxide or helium in the cell. The gas sheet having such a plurality of independent gas cells exhibits an excellent effect that cannot be expected with a porous polyurethane sheet constituting the inner fabric of a waterproof protective fire-fighting cloth with an air cell as disclosed in Korean Patent No. 10-0964968.

That is, although the porous polyurethane sheet can improve the heat insulating performance to some extent through the air contained in the inner air bubbles, the air in the air bubbles can escape at any time. Thus, the expected effect may not always achieved under any circumstances. Further, it is also difficult to obtain sufficient shock-buffering effect.

However, in the cloth as disclosed in the previously-filed patent application of the present applicant, since a plurality of gas cells are sealed in a gas sheet having a sufficient tensile strength, the filled gas does not leak out normally and can exhibit stable performance. In addition, the cloth is very suitable to be used in a fire extinguisher cloth which requires insulation and cooling because the gas cell may be ruptured at a specific high temperature (for example, above 100° C.) and the gas may leak out to function as a coolant. Further, the cloth may be used as a life jacket requiring buoyancy because the filled gas may allow the buoyancy.

As described above, the gas sheet in which a plurality of independent gas cells are formed has an advantage in producing a fabric having properties suited to functions for a fire-fighting suit or a life-saving clothing. However, there is a certain difficulty in manufacturing a gas sheet having a desired area.

That is, when manufacturing the gas sheet, a pair of suction rollers in which a plurality of gas cell forming grooves are formed, or a pressing machine operating up and down are provided in an airtight space. Then, gas is sprayed upstream a point where the gas sheets are combined, to fill the gas between the gas sheets. Then, the gas sheets are laminated into a layer using the rollers or pressing machine. Thus, the gas is filled in a gas cell formed in the shape of the gas cell forming groove. Accordingly, there was a limitation that the size of the gas sheet corresponds to the size the suction roller or the press.

In addition, since the gas sheet must be made of a non-breathable material so as to seal the gas, it is very difficult to discharge the sweat by using the gas sheet fabric.

The firefighter should wear heat-proof clothes to protect his body from an extremely hot temperature. Further, a lifeguard for saving a person in water should wear waterproof clothes to prevent the water from penetrating into the clothes. For example, the firefighter clothes may include an outshell, a middle layer, an inshell, and a felt pursuant to a special firefighter clothes standard specification.

The outshell should be made entirely of a woven textile of PBI (polybenzimidazole) based fibers, PBO (Polybenz oxazole) based fibers, or equivalent higher-graded fibers. In an alternative, the outshell should be made partially (at least 30%) of a woven textile of PBI (polybenzimidazole) based fibers, PBO (Polybenz oxazole) based fibers, or equivalent or higher-graded fibers, and the remaining portion may be made of aramid-based fibers or equivalent higher-graded fibers. The texture type of the outshell should be a rip-stop. Further, the middle layer, inshell, and felt should have good heat-resistance and water-proof properties. The inshell should be made of aramid-based fibers or equivalent higher-graded fibers to be soft and have a good sweat-absorption. When the felt is attached to the middle layer or inshell, the felt should be made of the same material as that of the middle layer or inshell.

This firefighter clothes with the water-proof and heat-resistance should have a standard specification in terms of a heat-resistance, a weight, an inshell cleaning time, a textile cost, etc. Currently, a domestic standard or an international NFPA standard for the firefighter clothes has details about the specification thereof.

The conventional firefighter clothes may have a layer configuration including the outshell, middle layer, inshell and felt, thereby to allow the heat-resistance performance in some degree. However, the heat-resistance performance exhibited by the conventional firefighter clothes may fall short of a heat-resistance performance specified by the NFPA standard. This may lead to a fire-damage of the firefighter in the event of fire. When using the water-proof stack configuration including the inshell/felt/water-proof textile layer, the water-proof performance thereof may not be good, leading to uncomfortable wearing feeling and, thus, low efficient activity of the wearer. Further, since the felt is similar to cotton, the felt may cause a drying time after washing the firefighter clothes to be at least three days.

In order to solve the above problems, Korean patent number 10-0964968 tilted as "inner cloth having air cells for firefighter clothes and firefighter clothes including the same" is disclosed. In this document, the inner cloth includes a stack of a heat-resistant felt, a porous polyurethane sheet having multiple air cells formed therein, each air cell containing bubbles, and an aramid cloth made of heat-resistant aromatic polyamide-based fibers in this order. However, the air cells may have poor cushioning ability, and may have a lower heat-resistance because they do not contain a gas with good cooling performance.

Further, the conventional lifesaving clothes may have a thick synthetic resin filled therein, leading to uncomfortable wearing feeling and lowered air content. Thus, the conventional lifesaving clothes may have a poor floating performance. Further, the conventional lifesaving clothes may not be easily flexible, leading to a lowered activity freedom of the lifeguard.

Prior art documents may be as follows: Korean patent number 10-0654365, Korean patent number 10-0964968, Korean patent application laid-open number 10-2012-0058837, and Korean patent number 10-0549545.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a cloth with independent gas cells and methods of fabricating the cloth wherein the cloth with independent gas cells may be formed by weaving a gas cell warp and a general fabric weft with each other such that the area of the cloth can be increased as desired, and gaps may be defined in the woven fabric to enable air permeability, and the manufacturing cost of the gas cell fabric may be reduced because there is no need to enlarge a roller or a press to make the gas cell warp.

Furthermore, the present disclosure is to provide a cloth including a gas sheet having multiple individual gas cells formed therein, each cell having substantially a sphere shape, each cell having a carbonic acid gas or helium gas filled therein, the gas sheet having a good stretchability, wherein each cell may be ruptured or maintained, if desired, wherein the present cloth may be employed for firefighter clothes or lifesaving clothes or may have different applications.

In one aspect, there is provided a fabric containing gas therein, the fabric comprising a weave between warps and wefts, wherein each warp includes an elongate array of a plurality of individual gas cells, wherein neighboring gas cells are physically coupled to each other via a connection, wherein the connection is monolithic with the gas cells, and each cell contains the gas therein.

In one implementation of the fabric, the connection has a twisted form.

In one implementation of the fabric, each wrap is made of at least one selected from a group consisting of a rubber, a synthetic rubber, a synthetic rubber, an oil-resistant rubber, a heat-resistant rubber, a butyl rubber, a thiocol rubber, a chloro-sulfonated polyethylene rubber, a polyurethane rubber, an acryl rubber, a silicon rubber, a viton rubber, a EPDM (Ethylene Propylene Diene Monomer) rubber, a polyurethane resin, a acryl resin, a silicon resin, a polyethylene resin, a polypropylene (PP) resin, a polyvinyl chloride (PVC) resin, and a polystyrene (CPS) resin.

In one implementation of the fabric, each gas cell has a spheric hollow gas cell film to define a gas receiving space therein, wherein a thickness of the spheric hollow gas cell film is in a range between about 0.5 mm and about 2.0 mm.

In one implementation of the fabric, the gas includes at least one of air, carbon dioxide, and helium.

In one implementation of the fabric, the fabric further comprises an inshell formed on one of both opposing faces of the fabric; and an outshell formed on the other of both opposing faces of the fabric.

In one aspect, there is provided a method for manufacturing a fabric containing gas therein, the fabric comprising a weave between warps and wefts, wherein the method comprises: providing warps wherein each warp includes an elongate array of a plurality of individual gas cells, wherein neighboring gas cells are physically coupled to each other via a connection, wherein the connection is monolithic with the gas cells, and each cell contains the gas therein; and weaving the warps with wefts using plain, twill, or satin weave.

In one implementation of the method, providing the warps comprises: placing a gas nozzle for injecting gas concentrically inside an elongate tube; pressure-feeding a rubber-based or synthetic resin-based yarn material in a liquid state into the tube while injecting the gas through the gas nozzle into the tube, thereby to form an elongate hollow yarn filled with gas; discharging the hollow yarn out of the tube; closing portions of the elongate hollow yarn along a length direction thereof using a thermal bonding and pressing to form the elongate array of the gas cells such that the connection is defined between the neighboring gas cells; and pressure-contacting one of neighboring gas cells with a surface of a bobbin and rotating the bobbin such that the connection is twisted.

In another aspect, there is provided a cloth comprising: a gas sheet including upper and lower planar sheet films and multiple individual gas cells formed between the upper and lower planar sheet films, wherein the sheet is made of an elastic material with stretchability in a range of about 200 to 800%, and a tensile strength of about 70 to 200 kg/cm$^2$; and a lower shape-keeping film and an upper shape-keeping film attached to the lower and upper planar sheet films respectively, wherein each of the lower shape-keeping film and upper shape-keeping film has a hollow embossed shape such that lower and upper inner spaces are defined between the lower shape-keeping film and the lower planar sheet film and between upper shape-keeping film and the upper planar sheet film respectively.

In one implementation of the cloth, the cloth further comprises a lower textile film and an upper textile film attached to the lower and upper planar sheet films of the gas sheet respectively, wherein the lower textile film and an upper textile film are disposed between the lower shape-keeping film and the lower planar sheet film and between upper shape-keeping film and the upper planar sheet film respectively.

In one implementation of the cloth, the elastic material includes at least one selected from a group consisting of a rubber, a synthetic rubber, a synthetic rubber, an oil-resistant rubber, a heat-resistant rubber, a butyl rubber, a thiocol rubber, a chloro-sulfonated polyethylene rubber, a polyurethane rubber, an acryl rubber, a silicon rubber, a viton rubber, a EPDM (Ethylene Propylene Diene Monomer) rubber, a polyurethane resin, a acryl resin, a silicon resin, a polyethylene resin, a polypropylene (PP) resin, a polyvinyl chloride (PVC) resin, and a polystyrene (CPS) resin.

In one implementation of the cloth, each gas cell has a spheric hollow gas cell film to define a gas receiving space therein, wherein the spheric hollow gas cell film has a thickness in a range between about 0.5 mm and about 2.0 mm and has a diameter in a range between about 2 mm and about 15 mm.

In one implementation of the cloth, the gas contained in the gas cell includes carbonic acid gas, wherein the lower textile film is made of a fireproof fabric and the upper textile film is made of a fabric.

In one implementation of the cloth, the gas contained in the gas cell includes helium gas, wherein the lower textile film is made of a waterproof fabric and the upper textile film is made of a fabric.

In one implementation of the cloth, lower and upper shock-absorption spaces are defined between neighboring gas cells and the lower and upper textile films respectively.

In one implementation of the cloth, the gas contained in the gas cell is different from a gas contained in the lower and upper shock-absorption spaces.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1:
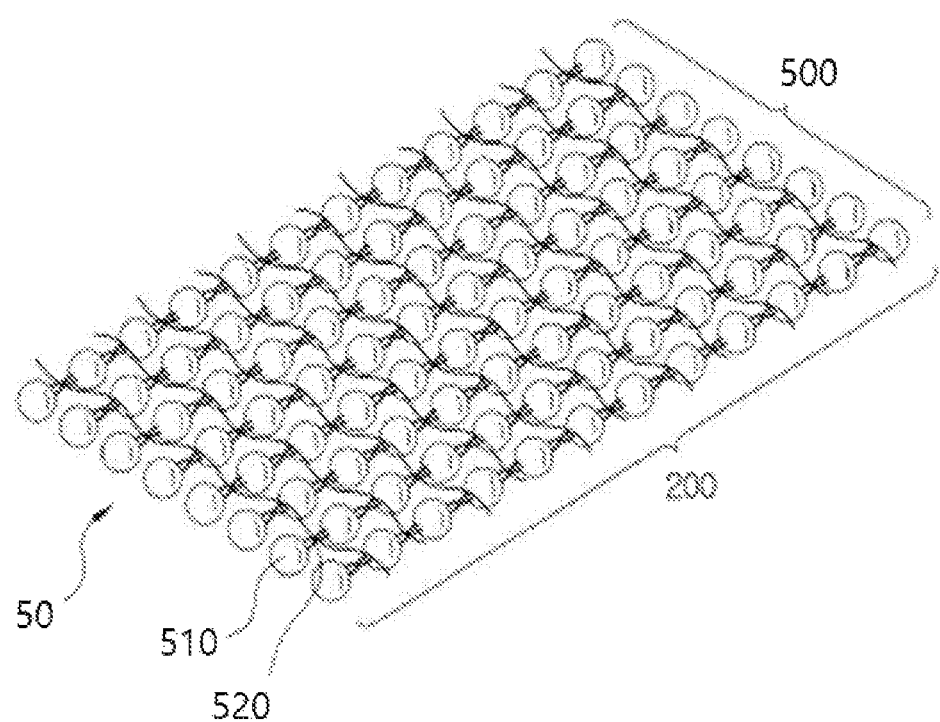
FIG. 1 is a perspective view of a woven structure of a gas cell fabric in accordance with a first embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Hereinafter, embodiments of the present disclosure will be described in details with reference to attached drawings.

First Embodiment

FIG. 1 is a perspective view of a woven structure 50 of a gas cell fabric in accordance with a first embodiment of the present disclosure. A reference will be made to FIG. 1 below.

The present gas cell fabric 50 may be formed by weaving the gas cell warp 500 in which a plurality of independent gas cells 510 are arranged in a row, and the weft 200, for example, a general fiber weft 200 (natural, synthetic, or both).

In this connection, the gas cell warp 500 refers to a thin and narrow elongate warp in which a plurality of independent gas cells 510 are arranged in a row with the gas cells being physically coupled to each other and each gas cell 510 is filled with a gas selected for a specific application thereof.

The wefts 200 may be woven with a matrix of the gas cell warps 500 to complete the gas cell fabric 50. The weaving configuration of the woven gas cell fabric 50 may vary slightly depending on the manner in which the weft 200 is woven with the warp 500, that is, plain weave, twill weave, and satin weave. By using a width of the weft 200 corresponding to the width of the warp 500 or by using a normal thin yarn as the weft 200, it is possible to realize a wider variety of weave patterns. In one example, FIG. 1 illustrates a gas cell fabric 50 of an embodiment in which a thin yarn as the weft 200 is woven with the warp 500.

Between the gas cells 510 of the gas cell warp 500, as shown in FIG. 1, a twist 520 may be formed. The twist may be formed by twisting the portion of a gas-filled sheet subjected to the thermal bonding wherein the gas filled sheet may be formed by filling the gas in a hollow sheet. This twist may improve the airtightness of the gas cell 510. This twist production will be described with reference to FIG. 3 in details in accordance with the present disclosure. The method for producing such a gas cell warp 500 is advantageous in that a large amount of the gas cell warp 500 can be continuously produced at a low cost without using a conventional large-area roller or press. The method for producing such a gas cell warp 500 will be described later in detail.

In addition, it is preferable that the gas to be filled in the gas cell 510 is selected as a gas having properties suitable in accordance with the use of the gas cell fabric 50. For example, when achieving the general level of insulation, shock-absorption effect, etc., it may suffice to fill the air, which does not require extra cost. When the cloth is used for a fire-fighting suit, the gas may embodied as carbon dioxide. Thus, when the gas cell 510 is ruptured in a high temperature environment, the carbon dioxide may leak out and, thus, the surface of the skin of the firefighter is cooled while flame propagation. In addition, it would be most desirable to fill the lightest helium among non-flammable (inert) gases in order to increase buoyancy in the case of a gas cell fabric 50 to be used in life-jackets used in water.

The gas cell warp 500 should basically be made of a material with substantially gas permeability-free material to seal the gas filled in the gas cell 510. In addition, it is also possible to use a material having an appropriate level of physical properties that are not ruptured by an external force unintendedly. For example, a material having a tensile strength in the range of 70 to 200 $kg/cm^2$ at a stretch ratio of 200 to 800% for a thickness equal to or smaller than 1 mm may be employed for the gas cell warp 500.

The elastic material of the gas cell warp may include rubbers or synthetic resins having the stretchability of about 200 to 800%. The elastic material of the gas cell warp may include, for example, rubbers such as a synthetic rubber, a synthetic rubber, an oil-resistant rubber, a heat-resistant rubber, a butyl rubber, a thiocol rubber, a chloro-sulfonated polyethylene rubber, a polyurethane rubber, an acryl rubber, a silicon rubber, a viton rubber, and a EPDM (Ethylene Propylene Diene Monomer) rubber; or synthetic resins such as polyurethane, acryl, silicon, polyethylene, polypropylene (PP), polyvinyl chloride (PVC), and polystyrene (CPS) resins. The gas sheet 1 being made of the above listed materials may have a good stretchability, and a tensile strength of about 70 to 200 kg/cm².

In this embodiment, when the present cloth is employed for the firefighter clothes, the gas sheet may be made of the polyurethane with a poor heat-resistant property, which, thus, may be ruptured at a temperature above 100° C. However, the present disclosure is not limited thereto. The present gas sheet may be made of a thermoplastic synthetic resin such as a polyethylene (PE), a polypropylene (PP), a polyvinyl chloride (PVC), and a polystyrene (CPS). Such thermoplastic synthetic resins are already known. Thus, such thermoplastic synthetic resins may enable the gas sheet 1 to have an excellent elastic restoring force.

In one embodiment of the present disclosure, each gas cell 510 may have a spheric hollow gas cell film to define a gas receiving space therein. The thickness of the spheric hollow gas cell film may vary depending on materials of a synthetic resin thereof. The thickness of the spheric hollow gas cell film may be in a range between about 0.5 mm and about 2 mm. A diameter of each gas cell 510 may be in a range between about 2 mm and about 20 mm. The diameter of each gas cell 11 may vary depending on the application of the present cloth. In this connection, when the present cloth is required to have a high tensile strength, the diameter of each gas cell 11 may be larger and the thickness of the spheric hollow gas cell film may be larger.

In this embodiment, the thickness of the spheric hollow gas cell film may be about 1 mm, and the diameter of each gas cell 11 may be about 10 mm. This is merely exemplary. The present disclosure is not limited thereto. As mentioned above, the thickness of the spheric hollow gas cell film and the diameter of each gas cell 11 may vary depending on the applications of the present cloth.

Figure 2:
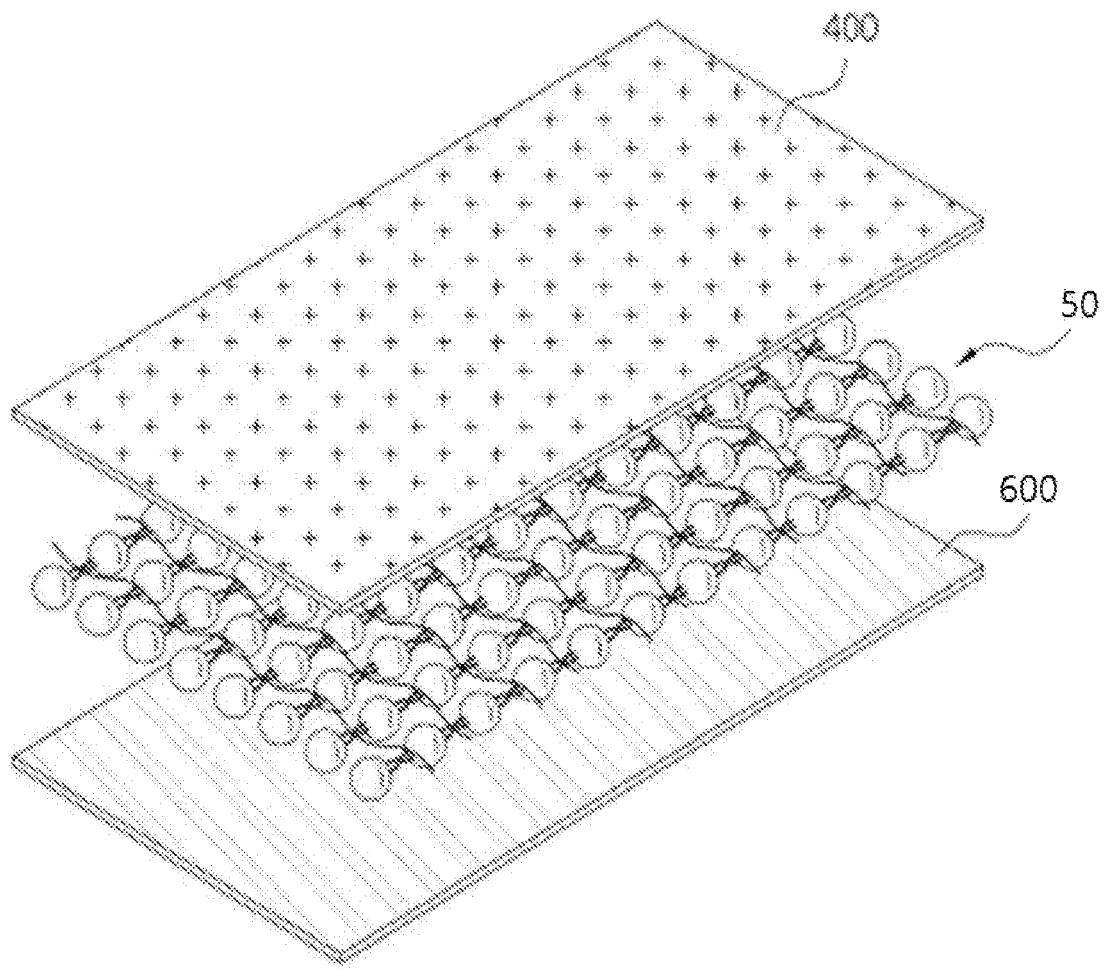
FIG. 2 is an exploded perspective view of a cloth with the woven structure with an outshell and inshell attached to the structure in FIG. 1.

FIG. 2 is an exploded perspective view of a cloth with the woven structure with an outshell and inshell attached to the structure in FIG. 1. As shown in FIG. 2, the inshell 600 and/or the outshell 400 may be padded on the both of lower and upper surfaces of the gas cell fabric 50 woven with the gas cell warp 500 and the general fiber weft 200, respectively.

The inshell 600 may be preferably made of a material to allow the user to feel comfortable wearing. In an alternative, when the present cloth is employed for the firefighter clothes or lifesaving clothes, the inshell 600 may be preferably made of a water-proof material. For this purpose, for example, an aramid fiber can be used as the inshell 600. Although, in this embodiment, the inshell is made of an aramid-based material, the inshell 600 may be made of a fabric material including a laminate textile.

The outshell 400 may be made of a textile material corresponding to the application of the present cloth. For example, when the present cloth is employed for the firefighter clothes, the outshell may be made of a woven textile of heat-resistant fibers. When the present cloth is employed for the lifesaving clothes, the outshell may be made of a textile with a floating and/or water-proof function.

In one embodiment, the outshell 400 may be made partially (at least 30%) or entirely of a woven textile of PBI (polybenzimidazole) based fibers, PBO (Polybenz oxazole) based fibers, or equivalent higher-graded fibers. This may allow the outshell 3 to have a great heat-resistance. The inshell 600 contacting a skin of the wearer may be made of aramid-based fibers or equivalent higher-graded fibers to be soft and have a good sweat-absorption.

In case of the floating textile, the outshell 400 may be made of a woven textile of water-floating fibers including core fibers having a larger specific gravity than water, and coating layers on the core fibers, the coating layers containing at least about 90 to 99% of a water-floating material. In this embodiment, the gas sheet 1 may be made of an oil-resistant rubber to prevent water from penetrating therein.

When the outshell 400 is made of the woven textile of the water-floating fibers including the core fibers having a larger specific gravity than water, and the coating layers on the core fibers, the coating layers containing at least about 90 to 99% of the water-floating material, the water-floating material of the coating layers may be an oil which has a water repellent property. Thus, the water-floating fibers having thereon the coating layers containing at least about 90 to 99% of the water-floating material may not permeable by water. Thus, an air layer in the water-floating fibers may not be occupied with water, leading to a maximized floating force. However, the present disclosure is not limited thereto. That is, the outshell may not be made of the woven textile of the above-defined water-floating fibers, but may be made of a general water-proof fabric or general outshell material.

Figure 3:
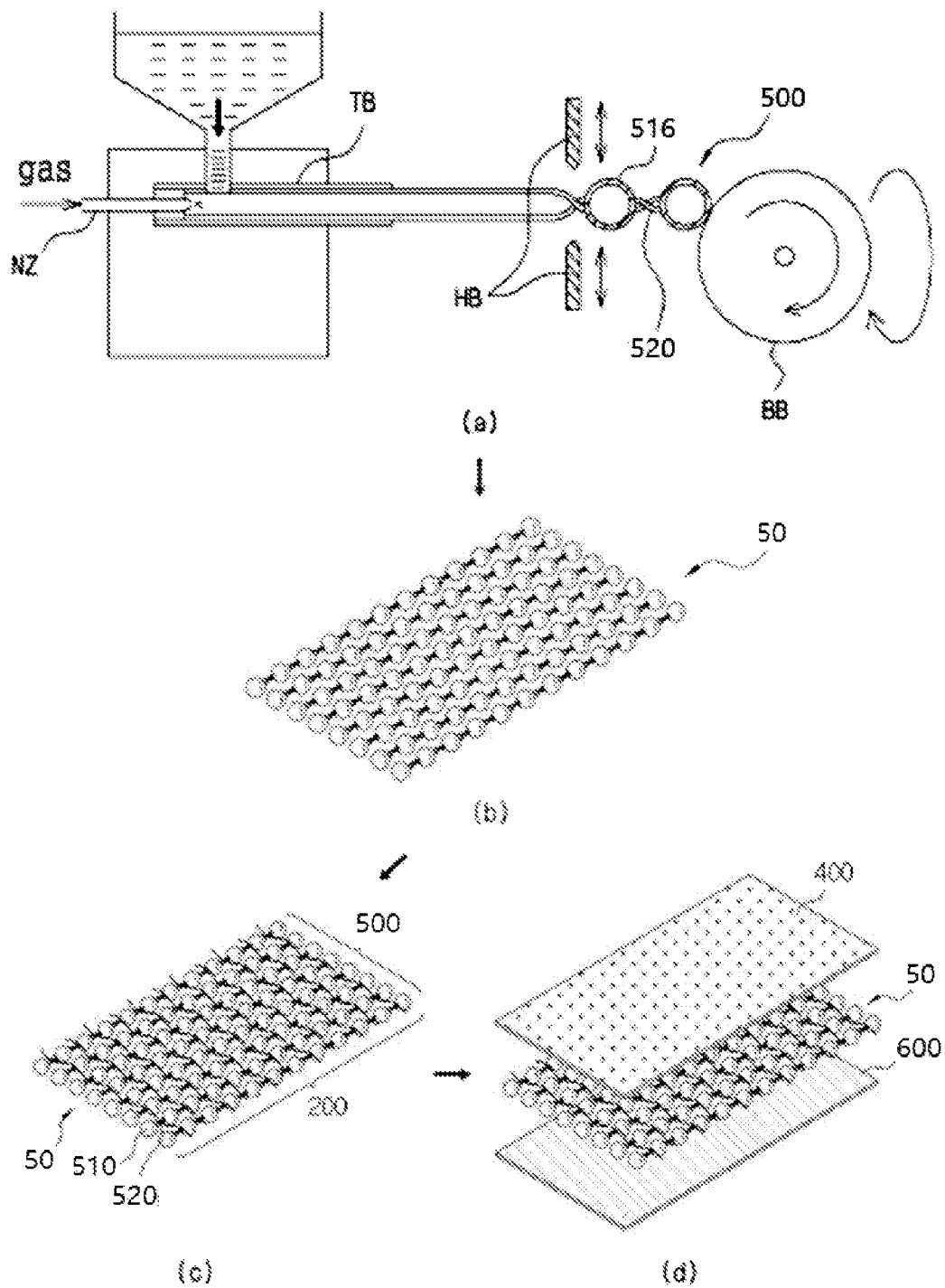
FIG. 3 is a flow diagram for illustrating a process for manufacturing the woven structure of the gas cell fabric in accordance with a first embodiment of the present disclosure.

FIG. 3 is a flow diagram for illustrating a process for manufacturing the woven structure of the gas cell fabric in accordance with a first embodiment of the present disclosure. Referring to FIG. 3, the process for manufacturing the woven structure of the gas cell fabric will be described.

Referring to FIG. 3, the method of manufacturing the gas cell fabric 50 of the present disclosure includes a step of preparing a gas cell warp 500 in which a plurality of independent gas cells 510 is arranged in a row and gas fills each of the gas cells 510, and a step of weaving the gas cell warp 500 with the weft 200 in the form of a woven fabric using plain weave, twill weave, or satin weave.

In this connection, the gas cell warp 500 may be fabricated by forming a elongate hollow yarn, and at the same time, injecting the gas into the inner space in the hollow yarn, and blocking multiple portions of the elongate hollow yarn along the length direction thereof using a thermal bonding or pressing such that an elongate array of the gas cells may be formed.

Specifically, a gas nozzle NZ for injecting gas is arranged concentrically inside a tube TB. While a rubber-based or synthetic resin-based yarn material in a liquid state is pressed and fed into the tube TB, a gas is injected through the gas nozzle NZ into the tube TB. In this way, the elongate hollow yarn may be formed.

Then, the hollow yarn may be discharged out of the tube TB and may be wound around a rotating bobbin BB. At this time, in order to form an elongate array of the gas cells, multiple portions of the elongate hollow yarn along the length direction thereof may be closed using a thermal bonding or pressing, for example, using thermal fusing means HB. In this way, a plurality of independent gas cells 510 may be formed. In addition, in order to form a twist 120 at each of the multiple portions of the elongate hollow yarn between the adjacent gas cells 510, each gas cell 510 may contact the surface of the rotating bobbin BB such that the cell 510 may rotate to twist the portion between the adjacent gas cells 510.

As described above, while the gas is injected into the hollow yarn, the multiple portions of the elongate hollow yarn along the length direction thereof is closed using a thermal bonding or pressing, for example, using thermal fusing means HB, and, at the same time, the resulting gas cell 510 is rotated to form the twist such that the airtightness of the gas cell 510 becomes more perfect. In addition, while the twisted portion 520 is formed between the gas cells 510, the yarn is twisted and, thus, the gas is pushed toward a newly formed gas cell 510. In this way, the gas cell 510 is filled with sufficient pressure gas to form a well-defined spherical or ellipsoidal gas cell 510. Therefore, the gas cell fabric 50 may have improvement in the shock-buffering function, insulation function, cooling function and/or buoyancy function.

Although FIG. 3 shows that only one gas cell warp 500 is manufactured in a single device in order that the manufacturing process of the gas cell warp 500 can be more easily understood. However, a plurality of gas cell warps 500 can be simultaneously manufactured in a single device.

Second Embodiment

Figure 4:
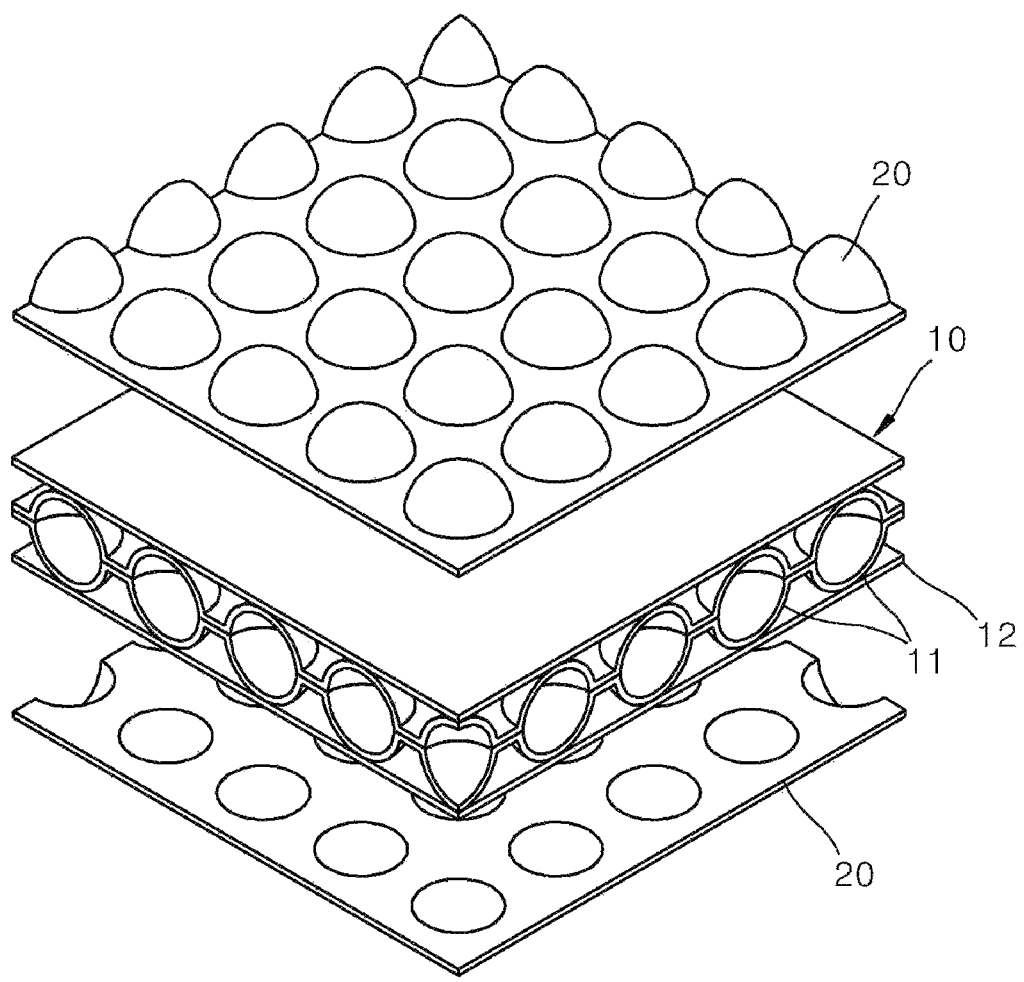
FIG. 4 is an exploded perspective view of a cloth with a gas cell sheet in accordance with a second embodiment of the present disclosure.

As shown in FIG. 4, a cloth including a gas sheet having multiple individual gas cells formed therein in accordance with a second embodiment of the present disclosure may include a gas sheet 10 including upper and lower planar sheet films 12 and multiple individual gas cells 11 formed between the upper and lower planar sheet films 12.

Each cell 11 may have a sphere shape or sphere-like shape. The gas sheet may have a good stretchability. Each gas cell may have a gas filled therein, and species of the gas may correspond to an application of the present cloth as descried below. The gas cells may be continuously connected in a matrix form. The stretchability may be in range of about 200 to 800%, and, to this end, the gas sheet may be made of an elastic material.

The present cloth may further include a lower shape-keeping film 20 and an upper shape-keeping film 20 attached to lower and upper sides of the gas sheet 10 respectively. Textile species of the lower shape-keeping film 20 and upper shape-keeping film 20 may correspond to an application of the present cloth as described below.

The elastic material of the gas sheet 10 may include rubbers or synthetic resins having the stretchability of about 200 to 800%. The elastic material of the gas sheet 10 may include, for example, rubbers such as a synthetic rubber, a synthetic rubber, an oil-resistant rubber, a heat-resistant rubber, a butyl rubber, a thiocol rubber, a chloro-sulfonated polyethylene rubber, a polyurethane rubber, an acryl rubber, a silicon rubber, a viton rubber, and a EPDM (Ethylene Propylene Diene Monomer) rubber; or synthetic resins such as polyurethane, acryl, silicon, polyethylene, polypropylene (PP), polyvinyl chloride (PVC), and polystyrene (CPS) resins. The gas sheet 10 being made of the above listed materials may have a good stretchability, and a tensile strength of about 70 to 200 kg/cm$^2$.

The species of the gas filled in each gas cell 11 of the gas sheet 10 may be suitable for an application of the present cloth. For example, when the present cloth is employed for firefighter clothes, the species of the gas may include a carbonic acid gas. When the present cloth is employed for lifesaving clothes, the species of the gas may include a helium gas. In the present disclosure, the multiple spherical gas cells 11 are connected continuously in a matrix form. In order to improve wearing feeling, the cloth may further include lower and upper planar vinyl films formed on the lower shape-keeping film 20 and upper shape-keeping film 20 respectively.

The flame retarding treatment may be selectively applied to the gas sheet 10. That is, when the flame-retarding treatment is performed on the gas sheet 10, the fabric is prevented from being damaged even in a high-temperature flame. On the other hand, when the flame-retarding treatment is not performed on the gas sheet 10, the raw gas sheet may be damaged by the high-temperature flame, so that the gas filled in the gas cell 11 leaks to the outside, thereby allowing the flame to be suppressed.

The lower shape-keeping film 20 and upper shape-keeping film 20 may be attached to the lower and upper planar sheet films 12 respectively. When the gas is filled into a shock-absorption space 15 defined in neighboring gas cells and the lower and upper planar sheet films 12, the lower shape-keeping film 20 and upper shape-keeping film 20 may act to prevent excessive expansion of the lower and upper planar sheet films 12 and may have an unchanged shape.

Figure 5A:
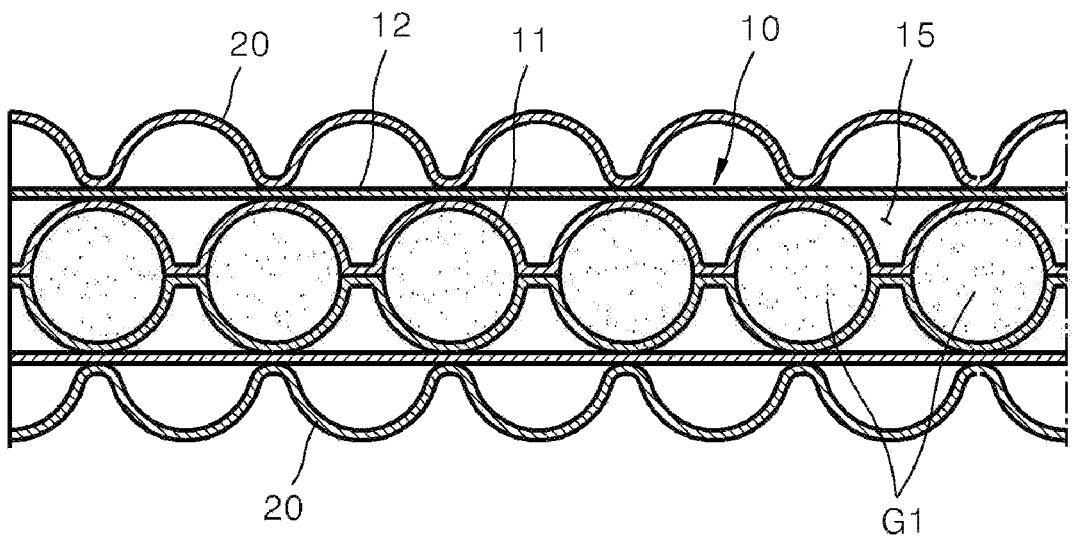
FIG. 5A and FIG. 5B are cross-sectional views of the cloth with the gas cell sheet in accordance with a second embodiment of the present disclosure.

As shown in FIG. 5A, each of the lower shape-keeping film 20 and upper shape-keeping film 20 may have a hollow embossed shape such that lower and upper inner space are defined between the lower shape-keeping film 20 and the lower planar sheet film 12 and between upper shape-keeping film 20 and the upper planar sheet film 12 respectively.

Figure 5B:
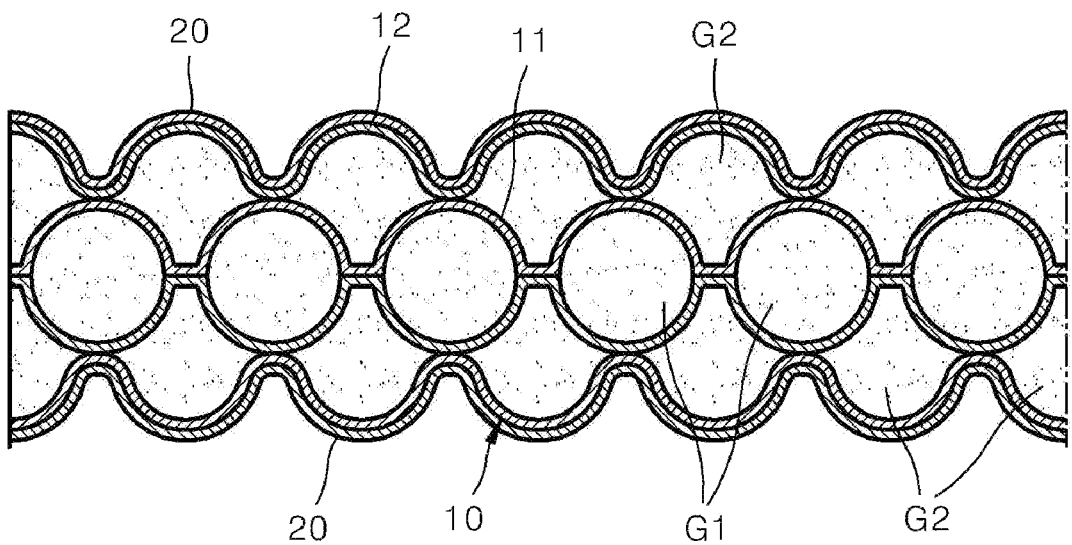

As shown in FIG. 5B, when expansions of the lower and upper planar sheet films 12 are executed, the lower shape-keeping film 20 and upper shape-keeping film 20 may act to prevent excessive expansion of the lower and upper planar sheet films 12 and may have an unchanged shape.

In this connection, the gas filled into the shock-absorption space 15 defined in neighboring gas cells and the lower and upper planar sheet films 12 may be the same as or different from the gas filled in the gas cell 11. When the gas G2 filled into the shock-absorption space 15 defined in neighboring gas cells and the lower and upper planar sheet films 12 is different from the gas G1 filled in the gas cell 11 as shown in FIG. 5A, the shock-absorption effect for the present cloth may be maximized.

Third Embodiment

Figure 6:
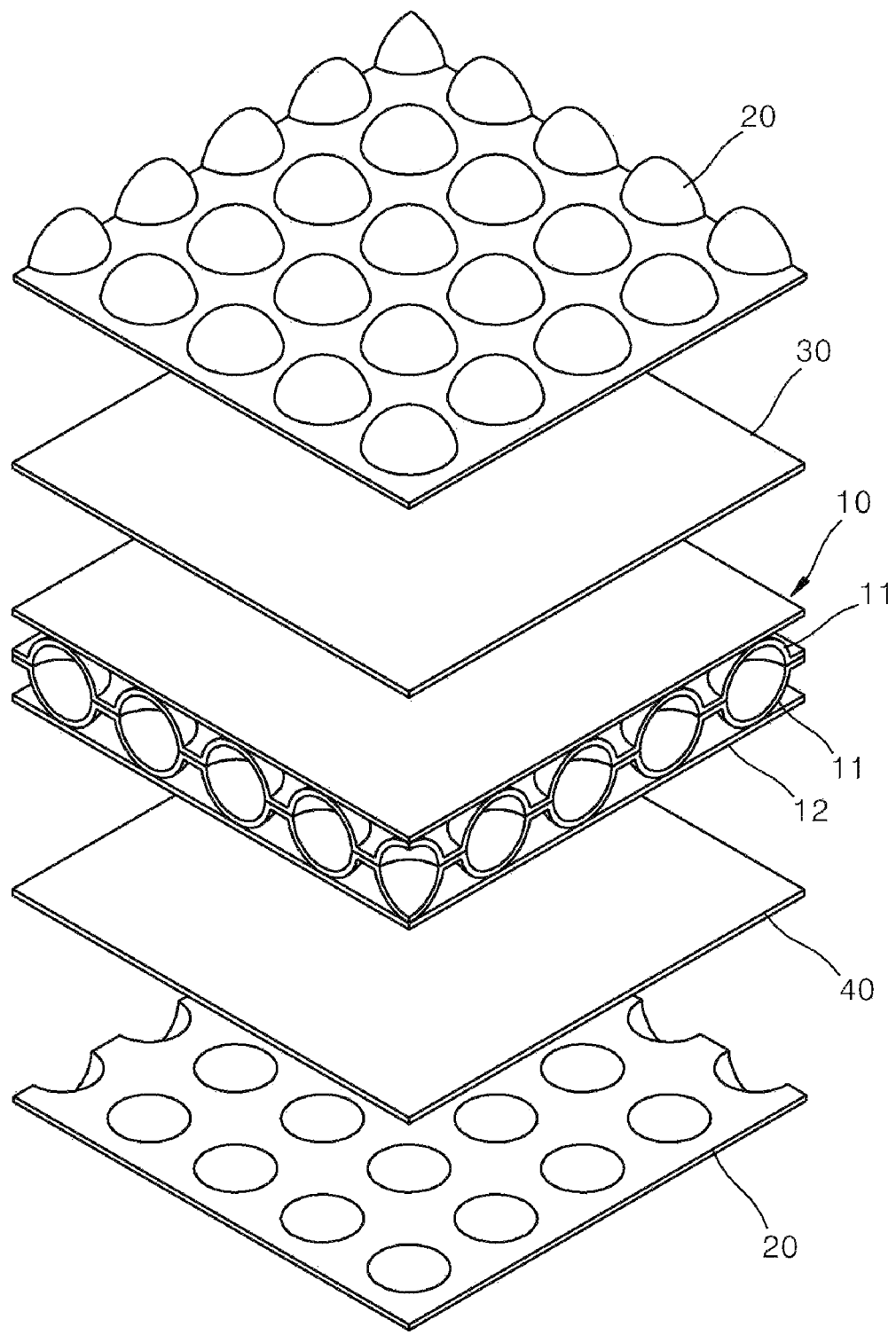
FIG. 6 is an exploded perspective view of a cloth with a gas cell sheet in accordance with a third embodiment of the present disclosure.

As shown in FIG. 6, a cloth including a gas sheet having multiple individual gas cells formed therein in accordance with a third embodiment of the present disclosure may include a gas sheet 10 including upper and lower planar sheet films 12 and multiple individual gas cells 11 formed between the upper and lower planar sheet films 12.

Each cell 11 may have a sphere shape or sphere-like shape. The gas sheet may have a good stretchability. Each gas cell may have a gas filled therein, and species of the gas may correspond to an application of the present cloth as descried below. The gas cells may be continuously connected in a matrix form. The stretchability may be in range of about 200 to 800%, and, to this end, the gas sheet may be made of an elastic material.

The present cloth may further include a lower textile film 40 and an upper textile film 30 attached to the lower and upper planar sheet films 12 of the gas sheet 10 respectively. Textile species of the lower textile film 40 and an upper textile film 30 may correspond to an application of the present cloth as described below.

The present cloth may further include a lower shape-keeping film 20 and an upper shape-keeping film 20 attached to the lower textile film 40 and an upper textile film 30 respectively. Textile species of the lower shape-keeping film 20 and upper shape-keeping film 20 may correspond to an application of the present cloth as described below.

The elastic material of the gas sheet 10 may include rubbers or synthetic resins having the stretchability of about 200 to 800%. The elastic material of the gas sheet 10 may include, for example, rubbers such as a synthetic rubber, a synthetic rubber, an oil-resistant rubber, a heat-resistant rubber, a butyl rubber, a thiocol rubber, a chloro-sulfonated polyethylene rubber, a polyurethane rubber, an acryl rubber, a silicon rubber, a viton rubber, and a EPDM (Ethylene Propylene Diene Monomer) rubber; or synthetic resins such as polyurethane, acryl, silicon, polyethylene, polypropylene (PP), polyvinyl chloride (PVC), and polystyrene (CPS) resins. The gas sheet 10 being made of the above listed materials may have a good stretchability, and a tensile strength of about 70 to 200 kg/cm$^2$.

The species of the gas filled in each gas cell 11 of the gas sheet 10 may be suitable for an application of the present cloth. For example, when the present cloth is employed for firefighter clothes, the species of the gas may include a carbonic acid gas. When the present cloth is employed for lifesaving clothes, the species of the gas may include a helium gas. In the present disclosure, the multiple spherical gas cells 11 are connected continuously in a matrix form. In order to improve wearing feeling, the cloth may further include lower and upper planar vinyl films formed on the lower shape-keeping film 20 and upper shape-keeping film 20 respectively.

The flame retarding treatment may be selectively applied to the gas sheet 10. That is, when the flame-retarding treatment is performed on the gas sheet 10, the fabric is prevented from being damaged even in a high-temperature flame. On the other hand, when the flame-retarding treatment is not performed on the gas sheet 10, the raw gas sheet may be damaged by the high-temperature flame, so that the gas filled in the gas cell 11 leaks to the outside, thereby allowing the flame to be suppressed.

When the gas is filled into a shock-absorption space 15 defined in neighboring gas cells and the lower and upper planar sheet films 12, the lower shape-keeping film 20 and upper shape-keeping film 20 may act to prevent excessive expansion of the lower and upper planar sheet films 12 and hence, the lower textile film 40 and an upper textile film 30 and may have an unchanged shape.

Figure 7A:
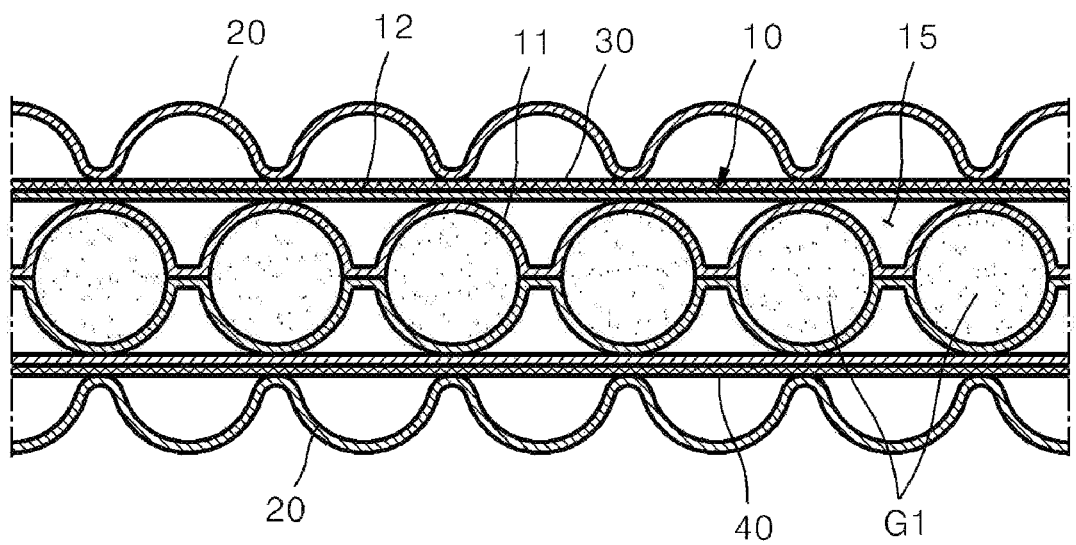
FIG. 7A and FIG. 7B are cross-sectional views of the cloth with the gas cell sheet in accordance with a third embodiment of the present disclosure.

As shown in FIG. 7A, each of the lower shape-keeping film 20 and upper shape-keeping film 20 may have a hollow embossed shape such that lower and upper inner space are defined between the lower textile film 40 and the lower shape-keeping film 20 and between the upper textile film 30 and the upper shape-keeping film 20.

Figure 7B:
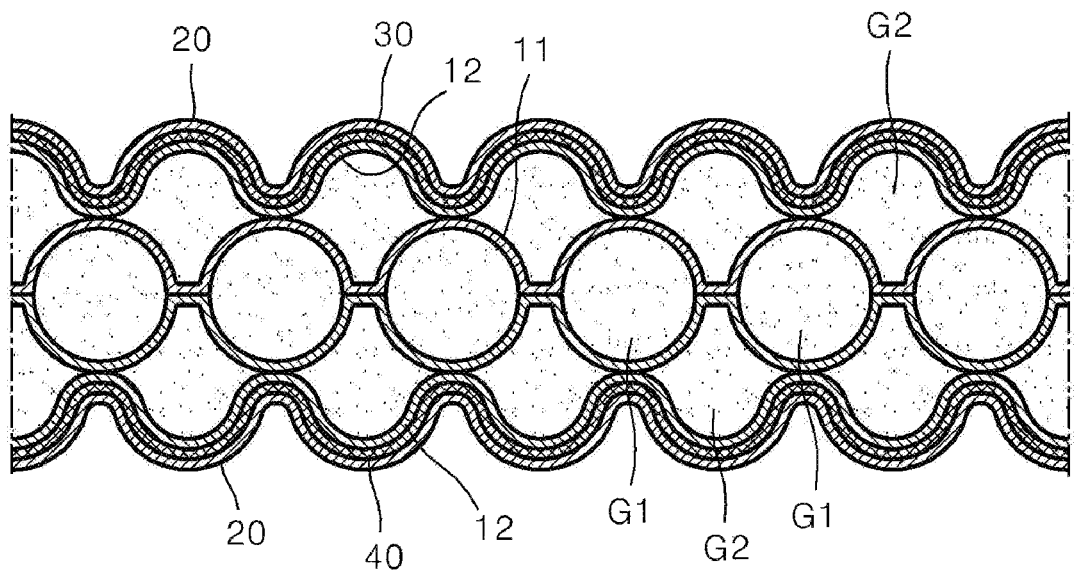

As shown in FIG. 7B, when expansions of the lower and upper planar sheet films 12 and, hence, the lower textile film 40 and an upper textile film 30 are executed, the lower shape-keeping film 20 and upper shape-keeping film 20 may act to prevent excessive expansion of the lower and upper planar sheet films 12 and hence, the lower textile film 40 and an upper textile film 30 and may have an unchanged shape.

In this connection, the gas filled into the shock-absorption space 15 defined in neighboring gas cells and the lower and upper planar sheet films 12 may be the same as or different from the gas filled in the gas cell 11. When the gas G2 filled into the shock-absorption space 15 defined in neighboring gas cells and the lower and upper planar sheet films 12 is different from the gas G1 filled in the gas cell 11 as shown in FIG. 7b, the shock-absorption effect for the present cloth may be maximized.

Gas Cell Production

Figure 8:
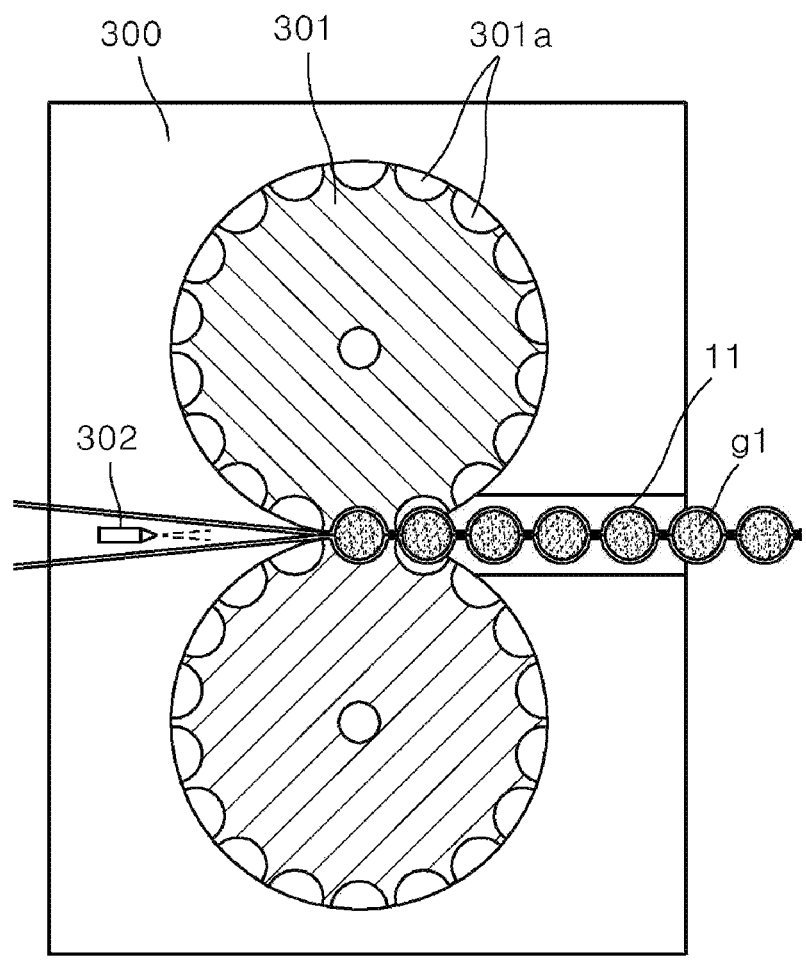
FIG. 8 illustrates an example for producing a gas cell in accordance with an embodiment of the present disclosure.

Referring to FIG. 8, the gas cell 11 having the gas filled therein may be formed as follows: first, a pair of suction rollers 301, each roller having multiple gas cell forming grooves 301a, and the each groove having a hemisphere shape, may be provided in a hermetic space 300, and, then, a gas g1 may be injected via a gas inject nozzle 302 into between the pair of suction rollers 301, and, next, the pair of suction rollers 301 may be combined such that the hemispheres of the corresponding grooves 301a are combined to a single spherical cell having the gas filled therein. The present disclosure is not limited thereto. For example, the gas g1 may be filled into the cell 11 using a press mechanism to move upwards and downwards in in a hermetic space.

One of the lower and upper shape-keeping films 20 may contact the skin. Thus, it may be preferably made of a material to allow the user to feel comfortable wearing. In an alternative, when the present cloth is employed for the firefighter clothes or lifesaving clothes, one of the lower and upper shape-keeping films 20 may be preferably made of a water-proof material.

The other of the lower and upper shape-keeping films 20 may contact an ambient. Thus, it may be made of a textile material corresponding to the application of the present cloth. For example, when the present cloth is employed for the firefighter clothes, the other of the lower and upper shape-keeping films 20 may be made of a woven textile of heat-resistant fibers. When the present cloth is employed for the lifesaving clothes, the other of the lower and upper shape-keeping films 20 may be made of a textile with a floating and/or water-proof function.

Figure 9:
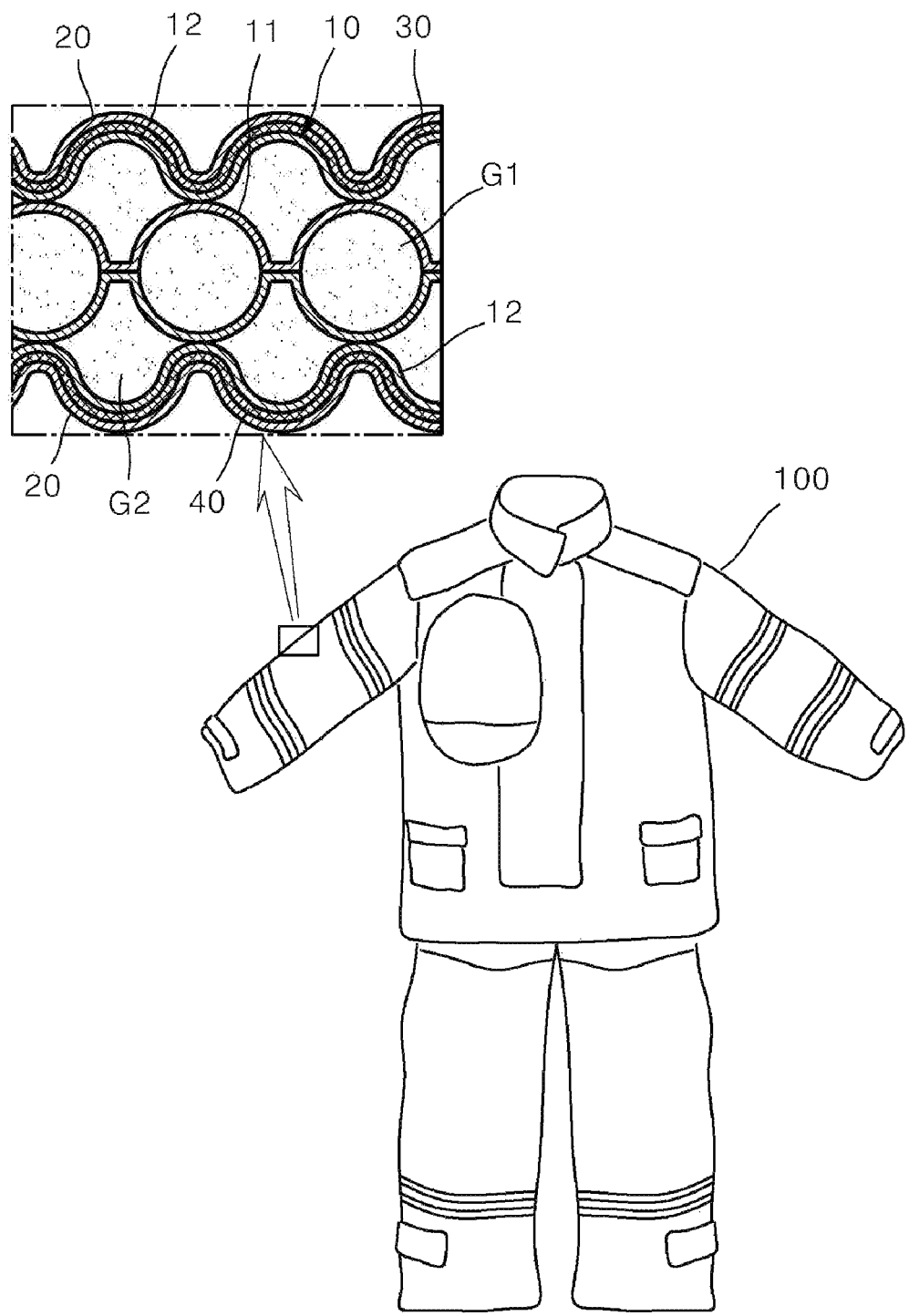
FIG. 9 shows firefighter clothes including the present cloth in FIG. 6.

As shown in an inset of FIG. 9, a cloth 100 including a gas sheet 10 having multiple individual gas cells 11 formed therein in accordance with one embodiment of the present disclosure may include a gas sheet 10 having multiple individual gas cells 11, each gas cell having a sphere shape, each gas cell having a carbonic acid gas G1 filled therein; an aramid-based inshell 30 on an inner side of the gas sheet 10, the inshell being soft and having a good sweat-absorption; and an outshell 40 on an outer side of the gas sheet 10, the outshell being made of a woven textile of PBI (polybenzimidazole) based heat-resistant fibers. In this connection, the shock-absorption spaces 15 defined between the neighboring gas cells 11 in the gas sheet 10 may be filled with a different gas G2 from the gas G1.

In this embodiment, the elastic material of the gas sheet 10 may be a polyurethane rubber or resin. The polyurethane refers to a collection of polymer compounds having urethane bonds generated by a combination of an alcohol group and an isocyanate group. A representative example thereof may be a spandex made of synthetic fibers. Urethane-based synthetic rubbers may be widely used. The urethane-based synthetic rubber may be polyester-based and polyether-based. The polyester-based urethane based synthetic rubber may be formed by reacting an ethylene glycol and an propylene glycol with an adipic acid to form a polyester, and then by urethanating the polyester having a molecular weight of up to 3,000 and having a OH group at both ends using a naphthalene-1, 5-diisocyanic acid, and, at the same time, by polymerizing the resultant product. The polyether-based urethane based synthetic rubber may be formed by forming an polyether via a mixture between a propylene oxide and an ethylene oxide, and by reacting OH groups at both ends of the polyether with a toluylene diisocyanic acid to form a polyurethane with a high molecular weight. Those polyurethanes may be used for a material of the gas sheet to exhibit a good tensile strength and stretchability. The present disclosure is not limited thereto. The polyethylene may be used for a material of the gas sheet. The polyethylene may be formed by separating a naphtha (100 to 200° C.) from an crude oil via a distillation and by decomposing the naphtha to form an about 25% ethylene, and, then, by polymerizing the ethylene. A variety of different types of polyethylene may be formed based on the polymerization methods. The polyethylene may be classified mainly into a low-density (soft) polyethylene and a high-density (hard) polyethylene.

The low-density (soft) polyethylene may be preferable for the material of the gas sheet. The low-density polyethylene may be produced via heating at least 1,000 atm, and at least 200° C. using a trace of air as a catalyst. Thus, the low-density polyethylene may be generally referred to as a high-pressure polyethylene, and may have about a 0.91 density. Since the low-density polyethylene has branches, an amount of a molecular array thereof is not sufficient. Further, a crystallized proportion thereof is about 65%, and, thus, the low-density polyethylene is soft and has a great stretchability. The low-density polyethylene has a low tensile strength but a high shock-resistance.

In this embodiment, when the present cloth is employed for the firefighter clothes, the gas sheet may be made of the polyurethane with a poor heat-resistant property, which, thus, may be ruptured at a temperature above 100° C. However, the present disclosure is not limited thereto. The present gas sheet may be made of a thermoplastic synthetic resin such as a polyethylene (PE), a polypropylene (PP), a polyvinyl chloride (PVC), and a polystyrene (CPS). Such thermoplastic synthetic resins are already known. Thus, such thermoplastic synthetic resins may enable the gas sheet 10 to have an excellent elastic restoring force.

Regarding the polyurethane, a soft polyurethane may be employed for the gas sheet. The soft polyurethane may enable the gas sheet to have the good cushioning property, stretchability, tensile strength, and wear-resistance.

In one embodiment, each gas cell 11 of the gas sheet 10 may have a spheric hollow gas cell film to define a gas receiving space therein. The thickness of the spheric hollow gas cell film may vary depending on materials of a synthetic resin thereof. The thickness of the spheric hollow gas cell film may be in a range between about 0.05 mm and about 0.9 mm. A diameter of each gas cell 11 may be in a range between about 2 mm and about 15 mm. The diameter of each gas cell 11 may vary depending on the application of the present cloth. In this connection, when the present cloth is required to have a high tensile strength, the diameter of each gas cell 11 may be larger and the thickness of the spheric hollow gas cell film may be larger.

In this embodiment, the thickness of the spheric hollow gas cell film may be about 0.2 mm, and the diameter of each gas cell 11 may be about 3 mm. This is merely exemplary. The present disclosure is not limited thereto. As mentioned above, the thickness of the spheric hollow gas cell film and the diameter of each gas cell 11 may vary depending on the applications of the present cloth.

Figure 10:
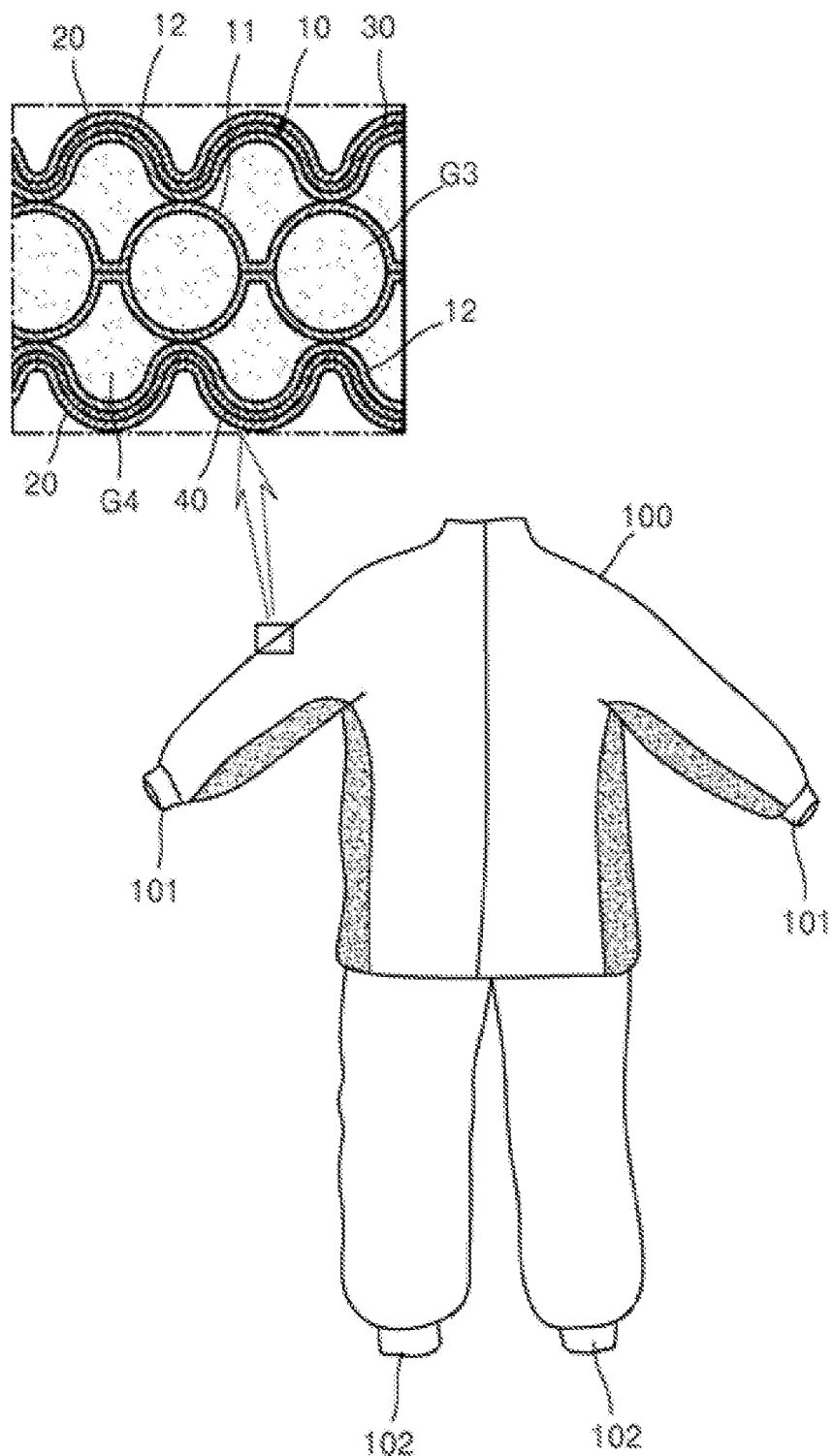
FIG. 10 shows lifesaving clothes including the present cloth in FIG. 6.

In the first embodiment, the gas cell 11 may contain the carbonic acid gas G1 filled therein. The carbonic acid gas may refer to a carbon dioxide gas which may act as a coolant. Thus, as shown in FIG. 10, when the present cloth is employed for the firefighter clothes 100, the spheric hollow gas cell film made of the polyurethane (being ruptured above 100° C.) may be ruptured in the event of the fire, especially, when being exposed to the very hot temperature, for example, above 100° C., and, thus, the carbonic acid gas may be discharged out of the cells to act as a coolant. In this connection, since the gas cells 11 are individually formed, the rupture of the gas cells 11 may individually occur. Before the gas cells 11 are ruptured, the gas cells may absorb the external shock via the deformation thereof to act as good shock-buffering or cushioning means.

In this embodiment, before the gas cells 11 are ruptured, the gas sheet 10 may bear a load 600 kgf/cm². Thus, it may be proved that, before the gas cells 11 are ruptured, the gas cells sufficiently absorb the external shock via the deformation thereof to act as good shock-buffering or cushioning means. In this connection, since the gas cells 11 are arranged in a matrix form, the gas sheet 1 may bear a load 500 kgf/cm² larger than the above load 600 kgf/cm².

Although, in this embodiment, the inshell is made of an aramid-based material, the inshell 30 may be made of a fabric material including a laminate textile.

In this embodiment, the outshell 40 may be made partially (at least 30%) or entirely of a woven textile of PBI (polybenzimidazole) based fibers, PBO (Polybenz oxazole) based fibers, or equivalent higher-graded fibers. This may allow the outshell 40 to have a great heat-resistance. The inshell 2 contacting a skin of the wearer may be made of aramid-based fibers or equivalent higher-graded fibers to be soft and have a good sweat-absorption.

In another embodiment of the present disclosure, the cloth including the gas sheet having multiple individual gas cells formed therein in accordance with the present disclosure may be employed for the lifesaving cloth. As shown in FIG. 10, the cloth including the gas sheet having multiple individual gas cells formed therein in accordance with the second embodiment of the present disclosure may include a gas sheet 1 having multiple individual gas cells 11 formed therein, each cell having substantially a sphere shape, wherein the multiple gas cells 11 each contains the helium gas G3 filled therein. In this embodiment, the inshell 30 may be made of aramid-based fibers or equivalent higher-graded fibers to be soft and have a good sweat-absorption. Further, the outshell 40 may be made of a floating and/or water-proof woven textile. In case of the floating textile, the outshell may be made of a woven textile of water-floating fibers including core fibers having a larger specific gravity than water, and coating layers on the core fibers, the coating layers containing at least about 90 to 99% of a water-floating material. In this embodiment, the gas sheet 10 may be made of an oil-resistant rubber to prevent water from penetrating therein.

When the outshell 40 is made of the woven textile of the water-floating fibers including the core fibers having a larger specific gravity than water, and the coating layers on the core fibers, the coating layers containing at least about 90 to 99% of the water-floating material, the water-floating material of the coating layers may be an oil which has a water repellent property. Thus, the water-floating fibers having thereon the coating layers containing at least about 90 to 99% of the water-floating material may not permeable by water. Thus, an air layer in the water-floating fibers may not be occupied with water, leading to a maximized floating force. However, the present disclosure is not limited thereto. That is, the outshell 40 may not be made of the woven textile of the above-defined water-floating fibers, but may be made of a general water-proof fabric or general outshell 40 material.

As shown in FIG. 10, the lifesaving clothes 100 using the cloth in accordance with this embodiment of the present disclosure may have sleeves 101 and/or pants bottoms 102 closed at free ends thereof using elastic rings such as rubber rings. In this way, when the lifesaving clothes 100 contacts water in a long time, the lifesaving cloth 100 may not be permeable by water. Further, the gas cell 11 of the gas sheet 10 may thermally-isolate the body of the wearer from the external environment, thereby to prevent the heat of the body from transferring to the external environment, and, thus, to suppress hypothermia of the wearer.

In this way, as in the first embodiment where the present cloth is employed for the firefighter clothes, in an event of the fire, the cells of the present cloth may be ruptured, and, thus, the carbonic acid gas may be discharged out of the cell to act as the heat-blocking agent or cooling agent. Further, as in the second embodiment where the present cloth is employed for the lifeguard clothes or life jacket, the helium gas in the cell may be maintained to act as the water-floating agent to facilitate the person wearing the clothes to be floated on the water. Furthermore, the gas cell may thermally-isolate the body of the wearer from the external environment, thereby to prevent the heat of the body from transferring to the external environment, and, thus, to suppress hypothermia of the wearer. The present cloth may be massively or reproducedly manufactured in a general cloth manufacturing process, thereby to have an industrialability.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A fabric containing gas therein, the fabric comprising a weave between warps and wefts, wherein each warp includes a single hollow yarn constituting of a single elongate array of a plurality of closed gas cells along a length thereof and neighboring closed gas cells are separated apart from each other by a connection which is formed by using thermal bonding and pressing of a portion of the hollow yarn along the length thereof, wherein each closed gas cell contains the gas therein, wherein the each closed gas cell has a spherical hollow gas cell film to define a gas receiving space therein, wherein the spherical hollow gas cell film is made of the same material as the hollow yarn and a thickness of the spherical hollow gas cell film is in a range between about 0.5 mm and about 2.0 mm, and wherein the hollow yarn is made of at least one material selected from a group consisting of a rubber, a synthetic rubber, a synthetic rubber, an oil-resistant rubber, a heat-resistant rubber, a butyl rubber, a polysulfide rubber, a chloro-sulfonated polyethylene rubber, a polyurethane rubber, an acryl rubber, a silicon rubber, a fluoroelastomer, a EPDM (Ethylene Propylene Diene Monomer) rubber, a polyurethane resin, a acryl resin, a silicon resin, a polyethylene resin, a polypropylene (PP) resin, a polyvinyl chloride (PVC) resin, and a polystyrene (PS) resin.

2. The fabric of claim 1, wherein the connection has a twisted form.

3. The fabric of claim 1, wherein the gas includes at least one of air, carbon dioxide, and helium.

4. A cloth comprising:
the fabric of claim 1;
an inshell formed on one of both opposing faces of the fabric; and
an outshell formed on the other of both opposing faces of the fabric.

* * * * *